United States Patent
Takaoka et al.

(10) Patent No.: US 7,509,024 B2
(45) Date of Patent: Mar. 24, 2009

(54) BROADCAST RECEIVING APPARATUS, BROADCAST RECEIVING SYSTEM, AND METHOD OF SELECTING MANIPULATE SIGNALS IN BROADCAST RECEIVING SYSTEM

(75) Inventors: Hirokazu Takaoka, Kanagawa (JP); Masashi Seko, Tokyo (JP)

(73) Assignee: Sony Corporation, Tokyo (JP)

( * ) Notice: Subject to any disclaimer, the term of this patent is extended or adjusted under 35 U.S.C. 154(b) by 912 days.

(21) Appl. No.: 10/864,237

(22) Filed: Jun. 9, 2004

(65) Prior Publication Data

US 2005/0013584 A1   Jan. 20, 2005

(30) Foreign Application Priority Data

Jun. 10, 2003  (JP)  ............................. 2003-165518
May 17, 2004  (JP)  ............................. 2004-146916

(51) Int. Cl.
*H04N 5/76*  (2006.01)
*H04N 7/00*  (2006.01)

(52) U.S. Cl. .......................................... 386/95; 386/46
(58) Field of Classification Search ...................... 386/1, 386/46, 95; 348/734, 552
See application file for complete search history.

(56) References Cited

U.S. PATENT DOCUMENTS 6,344,817 B1 *  2/2002  Verzulli ...................... 341/176

7,154,566 B2 *  12/2006  Gustafson et al. ........... 348/734

FOREIGN PATENT DOCUMENTS

| JP | 5 168065 | 7/1993 |
|---|---|---|
| JP | 7 75030 | 3/1995 |
| JP | 8-289248 | 11/1996 |
| JP | 2000-113576 | 4/2000 |
| JP | 2002-150712 | 5/2002 |
| JP | 2004-336593 | 11/2004 |

* cited by examiner

*Primary Examiner*—Thai Tran
*Assistant Examiner*—Nigar Chowdhury
(74) *Attorney, Agent, or Firm*—Frommer, Lawrence & Haug LLP; William S. Frommer; Thomas F. Presson (57) ABSTRACT

A broadcast receiving apparatus, broadcast receiving system and a method of selecting a control signal in the broadcast receiving system, in which a group of control signal codes for remote control signals for the recorder is automatically selected and the selected group of control signal codes is used to operate the recorder. The group of control signal codes for remote control signals used in a remote commander accessory to the recorder is stored in a nonvolatile memory in correlation with the manufacturer or model of the remote commander and recorder, a control signal code received from the remote commander is compared with a pre-stored group of control signal codes, a group of control signal codes corresponding to the recorder is selected, and the selected group of control signal codes is used to designate an operation of the recorder.

8 Claims, 5 Drawing Sheets

| MANUFACTURER | CONTROL SIGNAL CODE | | |
|---|---|---|---|
| COMPANY A | VTR1<br>VTR4 | VTR2<br>VTR5 | VTR3<br>VTR6 |
| COMPANY B | VTR1 | VTR2 | VTR3 |
| COMPANY C | VTR1 | | |
| COMPANY D | VTR1 | VTR2 | |
| ⋮ | | | |

| MANUFACTURER | CONTROL SIGNAL CODE | | |
|---|---|---|---|
| COMPANY A | VTR1　VTR4 | VTR2　VTR5 | VTR3　VTR6 |
| COMPANY B | VTR1 | VTR2 | VTR3 |
| COMPANY C | VTR1 | | |
| COMPANY D | VTR1 | VTR2 | |

| CUSTOM CODE | DATA CODE |

FIG. 3

| RECORDER MANUFACTURER'S NAME OR MODEL | CUSTOM CODE | DATA CODE |
|---|---|---|
| COMPANY A, VTR1 | COMPANY A, VTR1 | POWER ON/OFF, RECORD, REPRODUCE,... |
| COMPANY A, VTR2 | COMPANY A, VTR2 | |
| . . . . . | . . . . . | . . . . . |
| COMPANY A, VTR6 | COMPANY A, VTR6 | POWER ON/OFF, RECORD, REPRODUCE,... |
| COMPANY B, VTR1 | COMPANY B, VTR1 | POWER ON/OFF, RECORD, REPRODUCE,... |
| COMPANY B, VTR2 | COMPANY B, VTR2 | POWER ON/OFF, RECORD, REPRODUCE,... |
| COMPANY B, VTR3 | COMPANY B, VTR3 | POWER ON/OFF, RECORD, REPRODUCE,... |
| COMPANY C, VTR1 | COMPANY C, VTR1 | POWER ON/OFF, RECORD, REPRODUCE,... |
| COMPANY D, VTR1 | COMPANY D, VTR1 | POWER ON/OFF, RECORD, REPRODUCE,... |
| Company B, VTR2 | Company B, VTR2 | POWER ON/OFF, RECORD, REPRODUCE,... |
| . . . . . | . . . . . | . . . . . |
| | AUXILIARY VTR1 | |
| | AUXILIARY VTR2 | |
| | AUXILIARY VTR3 | |
| | . . . . . | |

BROADCAST RECEIVING APPARATUS, BROADCAST RECEIVING SYSTEM, AND METHOD OF SELECTING MANIPULATE SIGNALS IN BROADCAST RECEIVING SYSTEM

BACKGROUND OF THE INVENTION

1. Field of the Invention

The present invention relates to a broadcast receiving apparatus and broadcast receiving system, connected to a recorder remote-controllable by a remote commander to record audio and video signals to a recording medium and which receive audio and video signals sent from a broadcasting satellite or communications satellite and operate the recorder by remote control. The present invention also relates to a method of selecting a control signal for the broadcast receiving system.

This application claims the priority of the Japanese Patent Application Nos. 2003-165518 filed on Jun. 10, 2003 and 2004-146916 filed on May 17, 2004, the entireties of which are incorporated by reference herein.

2. Description of the Related Art

To record broadcast programs, there are already available video recording apparatuses such as video tape recorders. Generally, the recorder has a preprogrammed recording feature enabled by a tuner and timer built in the recorder itself and with which the user can record a desired program by setting a time and channel for the program.

However, each of the common recorders has only a VHF (very high frequency) and UHF (ultra-high frequency) tuner built therein and thus cannot receive directly any BS (broadcasting satellite) broadcast and CS (communications satellite) broadcast. Therefore, to receive such BS and CS broadcasts, the recorder is used with a receiver called "set-top box" (will be referred to as "STB" hereunder) capable of receiving BS/CS broadcast programs. The STB outputs a video signal corresponding to a received broadcast program to the video input terminal of the recorder which will thus be able to record a BS/SC broadcast program.

In case such an STB is used with the common recorder to record a BS/CS broadcast program, there will not take place any problem as long as the user manually tunes the STB channel to a desired program and starts recording of the program by the recorder simultaneously with the start of broadcasting the program. However, a problem will occur in recording a BS/CS broadcast program with the use of the preprogrammed recording feature of the recorder. For example, since the recorder itself cannot usually control directly the BS/CS tuner built in the STB, it cannot continuously record BS/CS broadcast programs on different channels or in different time slots with the use of the preprogrammed recording feature in the recorder.

Generally, the recorder is provided with a remote control feature to operate the recorder itself by remote control, and a remote control signal transmitter called "AV mouse" is available which can transmit a similar signal to a remote control signal sent from a remote commander accessory to the recorder. For controlling the operation of the recorder to record BS/CS broadcast programs on different channels or in different time slots, for example, with the use of the preprogrammed recording feature of the recorder, it has been proposed to connect the remote control signal transmitter (AV mouse) being connected to the STB for sending a remote control signal from the STB side to the recorder. More particularly, the electronic program guide (EPG) can be used to record BS/CS broadcast program as preprogrammed without designating any program broadcasting time and channel (cf. Japanese Published Unexamined Patent Application No. 2001-223953, for example).

To use such a remote control signal transmitter, a group of control signal codes for remote control signals used in each of commercially available recorders and different from one to another of the manufacturers or models of the recorders is stored in a storage means built in the STB, and the user designates a group of control signal codes sent from the remote control signal transmitter while making a reference to a check list specifying a correspondence between the manufacturer of his or her recorder and the group of remote control signal codes used in the recorder.

Figure 1:
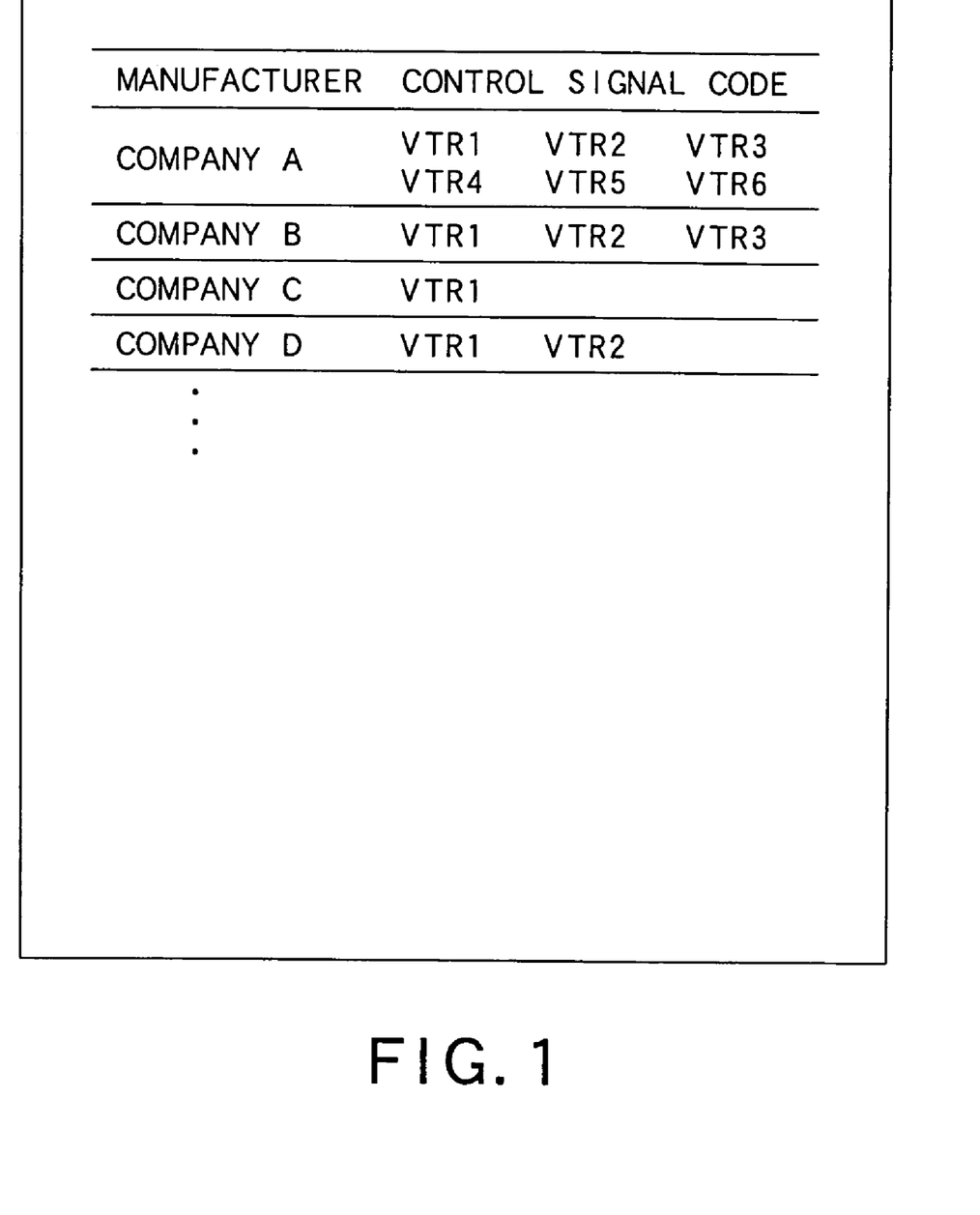
FIG. 1 explains the conventional method of selecting a remote control signal.

However, the remote group of control signal codes used in the recorder is different from one to another of the recorder manufacturers as shown in FIG. 1. Also, a plurality of groups of control signal codes is registered in each of recorders made by one manufacturer in many cases. For example, a video tape recorder manufacturer A uses six groups of control signal codes in the video tape recorder as shown in FIG. 1. In this case, to operate the remote control signal transmitter, the user of the video tape recorder has to find, by try and error, a group of control signal codes used in the recorder to be controlled. However, this finding cannot be attained so easily.

Also, in case the manufacturer of a recorder adopts a new group of control signal codes in the recorder, the remote control signal transmitter will not possibly be used.

Note that to deal with a new group of control signal codes, a remote commander has been proposed which can add a new group of control signal codes to a user's recorder with the use of an external-device controlling transmitter/receiver having a learning mode of operation (cf. Japanese Published Unexamined Patent Application No. 1998-207509, for example). The remote commander disclosed in the Japanese Published Unexamined Patent Application No. 1998-207509 can add a new group of control signal codes to a user's recorder. With this remote commander, however, the user has to set, by try and error, a group of control signal codes to be used actually, which setting is also very troublesome.

OBJECT AND SUMMARY OF THE INVENTION

It is therefore an object of the present invention to overcome the above-mentioned drawbacks of the related art by providing a broadcast receiving apparatus, broadcast receiving system, capable of automatically select a group of remote control signal codes for a recorder and controls the recorder with the selected group of control signals, and a method of selecting a control signal in the broadcast receiving system.

The above object can be attained by providing a broadcast receiving apparatus which receives a broadcast signal and supplies a recorder, remote-controllable with a remote control signal from a remote commander, with audio information and video information in the broadcast signal which are to be recorded to the recorder, the apparatus including, according to the present invention, a memory in which control signal codes possibly usable as signals for remote control of the recorder and which include information such as the manufacturer's name or model of the recorder are collected by manufacturer or model of the recorder into a group of control signal codes and the group of control signal codes is stored in correlation with the recorder manufacturer or model; a receiver which receives a remote control signal output from the remote commander and detects a control signal code included in the remote control signal; a selector which makes a comparison between the recorder manufacturer or model information included in the control signal code detected by the receiver and one stored in the memory and selects, in case the recorder manufacturer or model information included in the detected control signal code is stored in the memory, a group of control signal codes corresponding to the recorder manufacturer or model information included in the control signal code detected by the receiver as a group of control signal codes corresponding to the recorder; an operation controller which generates, from the group of control signal codes selected by the selector, a control signal code for remote control of the operation of the recorder; and a transmitter which sends a remote control signal to the recorder on the basis of the control signal code generated by the operation controller.

Also the above object can be attained by providing a broadcast receiving system including a recorder remote-controllable with a remote control signal from a remote commander and a broadcast receiving apparatus which receives a broadcast signal and supplies the recorder with audio information and video information in the broadcast signal which are to be recorded to the recorder, the broadcast receiving apparatus including, according to the present invention, a memory in which control signal codes possibly usable as signals for remote control of the recorder and which include information such as the manufacturer's name or model of the recorder are collected by r manufacturer or model of the recorder into a group of control signal codes and the group of control signal codes is stored in correlation with the recorder manufacturer or model; a receiver which receives a remote control signal output from the remote commander and detects a control signal code included in the remote control signal; a selector which makes a comparison between the recorder manufacturer or model information included in the control signal code detected by the receiver and one stored in the memory and selects, in case the recorder manufacturer or model information included in the detected control signal code is stored in the memory, a group of control signal codes corresponding to the recorder manufacturer or model information included in the control signal code detected by the receiver as a group of control signal codes corresponding to the recorder; an operation controller which generates, from the group of control signal codes selected by the selector, a control signal code for remote control of the operation of the recorder; and a transmitter which sends a remote control signal to the recorder on the basis of the control signal code generated by the operation controller.

Also the above object can be attained by providing a method of selecting a control signal in a broadcast receiving system including a recorder remote-controllable with a remote control signal from a remote commander and a broadcast receiving apparatus which receives a broadcast signal and supplies the recorder with audio information and video information in the broadcast signal which are to be recorded to the recorder and in which the recorder is remote-controlled by the broadcast receiving apparatus, the method including, according to the present invention, a reception step in which there is received a remote control signal output from the remote and there is detected a control signal code including information such as the manufacturer's name or model of the recorder, included in the remote control signal; a selection step in which there is made a comparison between the recorder manufacturer or model information included in the control signal code detected in the reception step and that stored in a memory in correlation with a group of control signal codes into which control signal codes possibly usable as signals for remote control of the recorder being collected by manufacturer or model of the recorder and, in case the recorder manufacturer or model information included in the detected control signal code is stored in the memory, there is selected a group of control signal codes corresponding to the recorder manufacturer or model information included in the control signal code detected in the reception step as a group of control signal codes corresponding to the recorder; an operation control step in which there is generated, from the group of control signal codes selected in the selection step, a control signal code for remote control of the operation of the recorder; and a transmission step in which there is sent a remote control signal to the recorder on the basis of the control signal code generated in the operation control step.

According to the present invention, control signal codes possibly usable as signals for remote control of the recorder and which include information such as the manufacturer's name or model of the recorder are collected by manufacturer or model of the recorder into a group of control signal codes, the group of control signal codes is stored in correlation with the recorder manufacturer or model, the recording manufacturer or model information included in the control signal code is compared with that stored in the memory, whereby there can be selected a group of control signal codes corresponding to the recorder.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

In the method of selecting a control signal in an embodiment of the broadcast receiving system according to the present invention, a group of control signal codes for remote control signals used in a remote commander accessory to a recorder is stored in a memory in correlation with the manufacturer or model of the remote commander and recorder, a control signal code received from the remote commander according to the recorder to be controller is compared with a pre-stored group of control signal codes, a group of control signal codes corresponding to the recorder is selected, and the selected group of control signal codes is used to designate an operation of the recorder.

The remote control method typically uses a radio wave in a specific frequency band, infrared radiation or the like. The embodiment of the present invention adopts a remote control method based on a highly versatile infrared radiation for common electronic devices. For transmission of a signal designating an operation of an electronic device on an infrared radiation, the SIRCS (Sony Infrared Remote Control system) standard is available. According to the SIRCS standard, control signal codes are assigned to each of electronic devices such as television set, video tape recorder and the like, and different control signal codes are assigned to even electronic devices in the same category, respectively. Therefore, as in FIG. 1 showing a table of control signal codes used by VTR manufacturers, for example, even one manufacturer uses a plurality of control signal codes for its VTR products. For example, the company A employs control signal codes VTR1 to VTR6 to each of which there corresponds a group of control signal codes for power on/off, input selection, etc. in six different models of video tape recorders. That is, one group of control signal codes include various control signal codes for power on/off, input selection and the like, used in a specific VTR.

Figure 2:
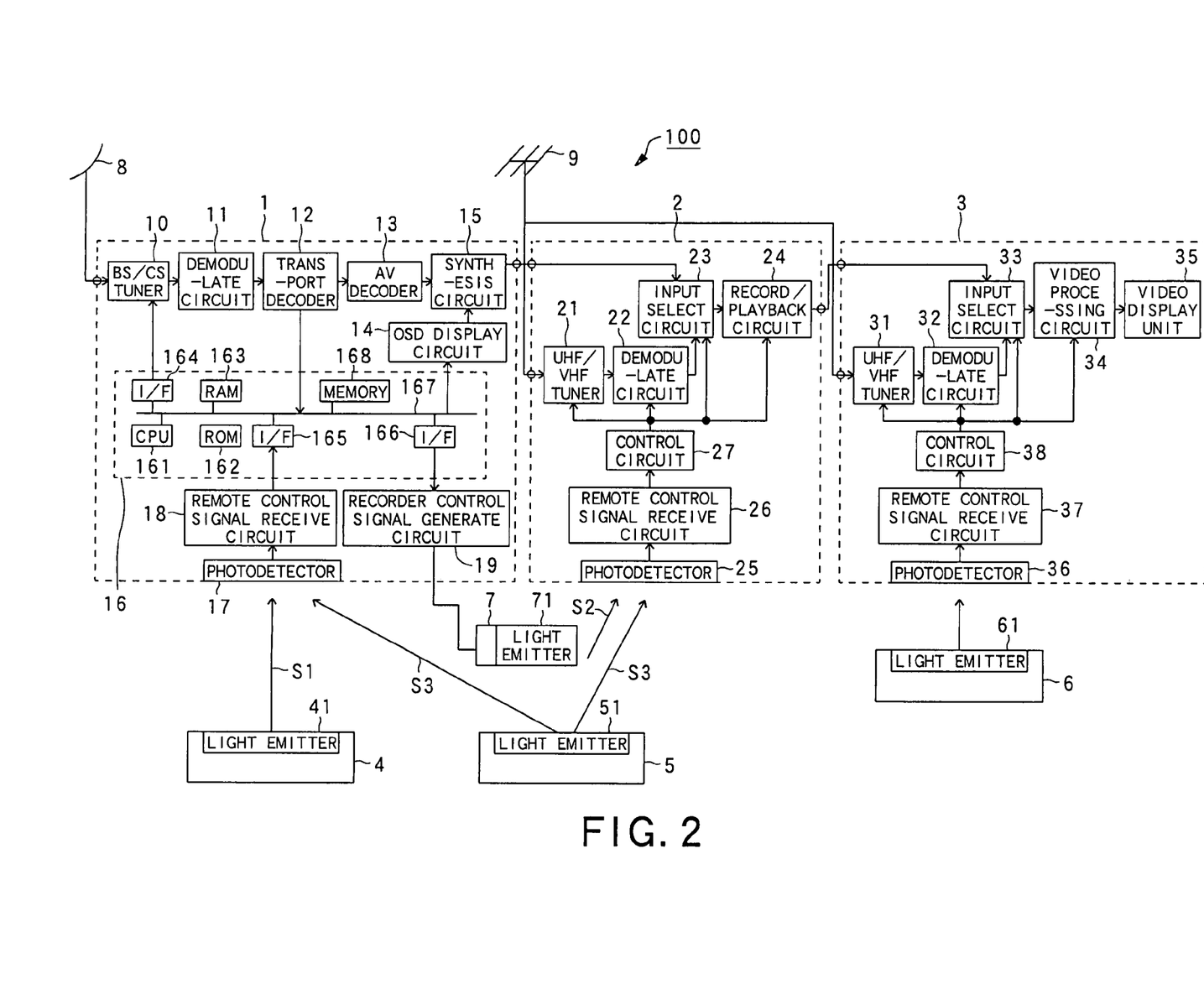
FIG. 2 is. a block diagram showing the overall configuration of the broadcast receiving system according to the present invention.

The present invention will be described in more detail below concerning the embodiment thereof with reference to the accompanying drawings. FIG. 2 is a block diagram showing the overall configuration of an embodiment of the broadcast receiving system according to the present invention. The broadcast receiving system is generally indicated with a reference 100. As shown, the reception system 100 includes a receiver 1 called "set-top box" for BS (broadcasting satellite)/CS (communications satellite) digital broadcasting, a recorder 2 for recording a program such as video tape recorder or the like, a TV set 3 with an LCD (liquid crystal display) etc., and remote commanders 4, 5 and 6 called "remote controller" accessory to the units 1, 2 and 3, respectively. The reception system 100 can receive, by the receiver 1, broadcast signals which would not be receivable by the recorder 2 and TV set 3, and record the signals by the recorder 2.

Also, a remote control signal transmitter 7 called "AV (audio visual) mouse" is accessory to the receiver 1. The remote control signal transmitter 7 has a light emitter 71. With the light emitter 71 directed to a photodetector 25 provided at the recorder 2, the remote control signal transmitter 7 sends a remote control signal S2 similar to a remote control signal S3 which is sent from the remote commander 5 of the recorder 2, whereby the recorder 2 can be controlled by the receiver 1.

As shown, the receiver 1 includes a BS/CS antenna 8, a BS/CS tuner 10 that selects a digital modulated signal in a broadcast signal received by the BS/CS antenna 8, a demodulation circuit 11 that demodulates the selected digital modulated signal, a transport recorder 12 that selects and filters a packet of a desired program from a demodulated MPEG-2 TS (Moving Picture Experts Group-2 Transport Stream) signal, an AV decoder 13 that extracts, from the selected packet, a PES (packetized elementary stream) signal which is a stream signal that carries data on specific elements such as picture, sound, etc. and decodes the picture and sound, an OSD (on-screen display) display circuit 14 that provides a display of program information, characters and graphics, etc. on a picture, and a synthesis circuit 15 that reads program information, characters and graphics, etc. to be displayed in an appropriate timing, combines them with a picture and provides the data as an output.

The receiver 1 also includes a photodetector 17 that detects a remote control signal S1 sent from the remote commander 4 accessory to the receiver 1 and the remote control signal S3 sent from the remote commander 5 of the recorder 2, which will be described in detail later, a remote control signal reception circuit 18 that decodes a remote control signal received by the photodetector 17, and a controller 16 that controls the channel selection at the BS/CS tuner 10, display at the OSD (on-screen display) display circuit 14, the remote control signal transmitter 7, etc. As shown, the above controller 16 includes a CPU (central processing unit) 161, ROM (read-only memory) 162, RAM (random-access memory) 163, interfaces 164, 165 and 166, bus 167, nonvolatile memory 168, etc. It controls the reception of BS/CS digital broadcast and channel selection, and also the operation of the recorder 2 by means of the remote control signal transmitter 7. The ROM 162 stores programs that are to be executed by the CPU 161. Also, the nonvolatile memory 168 stores a group of control signal codes for remote control signals used in the remote commander 5 accessory to the recorder 2 in correlation with the manufacturer and model of the recorder. According to the present invention, the RAM 163 is used as a work area for execution of a program. It should be noted that circuit blocks in the controller 16 are connected to each other via the bus 167 and thus program information and databroadcast data from the transport recorder 12 are written into the RAM 163 via the bus 167.

The remote control signal transmitter 7 is positioned with the light emitter 71 thereof being directed toward the photodetector 25 of the recorder 2 and as close to the photodetector 25 as possible. The remote control signal S2 sent from the remote control signal transmitter 7 is automatically set to have assigned thereto the same control signal code as that for the remote control signal S3 sent from the remote commander 5 accessory to the recorder 2, as will be described in detail later.

The remote control signal reception circuit 18 in the receiver 1 decodes a remote control signal captured by the photodetector 17 and reads a control signal code for the remote control signal. The remote control signal code is supplied to the controller 16 via the interface 165.

It is assumed here that the remote control signal transmitter 7 is used to set the type of a control signal code of a necessary remote control signal for remote control of the recorder 2. When the user presses a predetermined-operation button (not shown) for the recorder remote commander 5 of the recorder 2 while directing the light emitter 51 of the recorder remote commander 5 toward the photodetector 17 of the receiver 1, the controller 16 will control the remote commander 5 of the recorder 2 to provide a remote control signal S3 corresponding to the predetermined operation of the remote commander 5.

Figure 3:
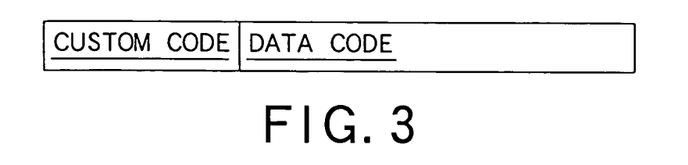
FIG. 3 schematically illustrates a control signal code.

Also the controller 16 will detect, by the photodetector 17, a remote control signal corresponding to the predetermined operation, supplied from the recorder remote commander 5, and decodes the remote control signal by the remote control signal reception circuit 18 to provide a control signal code for the predetermined operation. Then, the controller 16 will make a comparison between the received control signal code for the predetermined operation and a group of control signal codes, pre-stored in the nonvolatile memory 168 to judge whether the received control signal code for the predetermined operation has been pre-stored in the nonvolatile memory 168. Since the control signal code includes a custom code indicating a manufacturer's name, model or the like and a data code following the custom code and indicating an actual type of control as shown in FIG. 3, the controller 16 can judge, by making a comparison with the custom code, for example, whether the received control signal code for the predetermined operation has been pre-stored in the nonvolatile memory 168.

Note that the actual control signal code includes, in addition to the custom and data codes, other data which are not be referred to herein.

The nonvolatile memory 168 collects, by manufacturer's name or model of the recorder 2, control signal codes possibly usable for remote control of the recorder 2 and including information such as the manufacturer's name or model of the recorder into a group of control signal codes, and stores the group of control signal codes in correlation with the information such as the recorder manufacturer's name or model.

Figure 4:
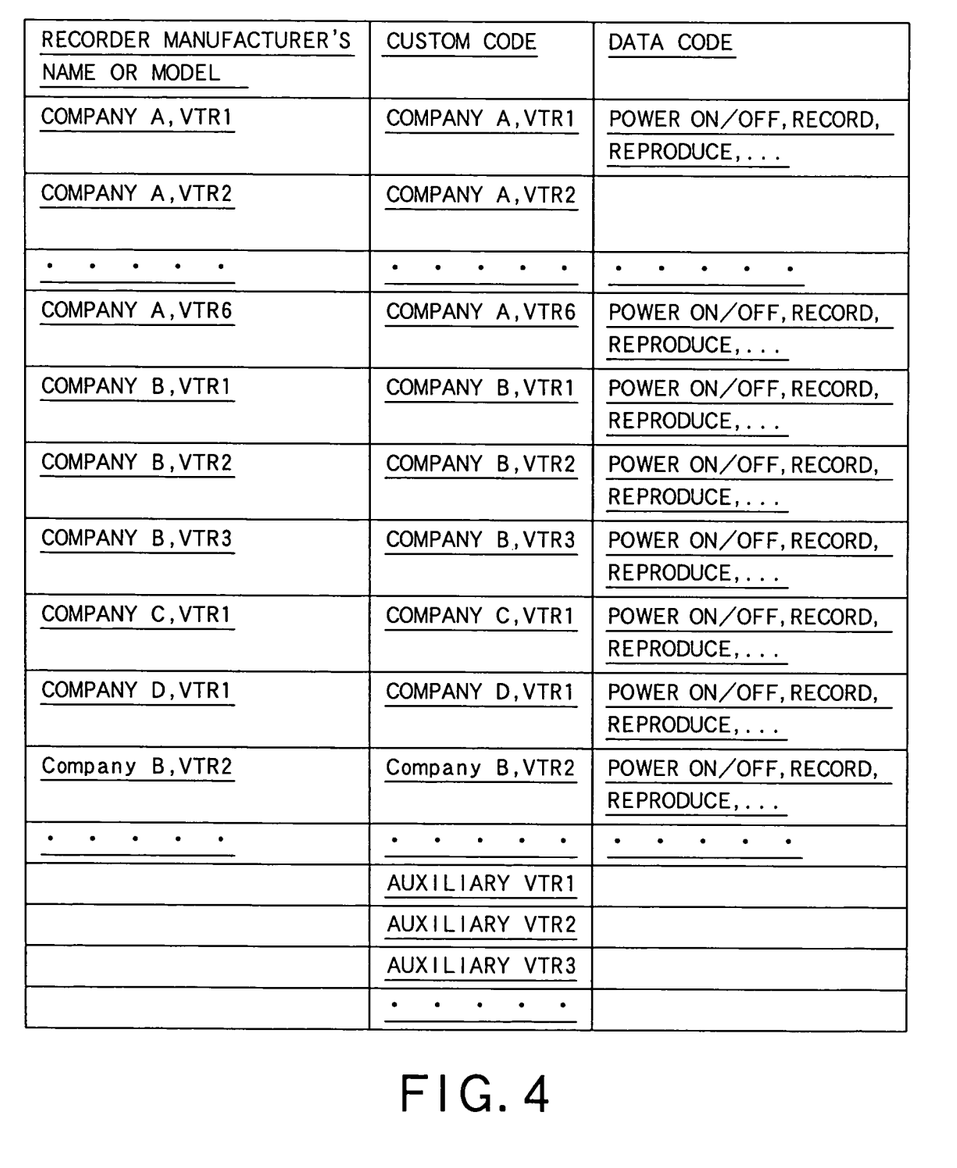
FIG. 4 schematically illustrates a group of control signal codes stored in a nonvolatile memory.

FIG. 4 schematically illustrates a group of control signal codes stored in the nonvolatile memory 168. Having determined that a control signal code corresponding to the control signal code received by the photodetector 17 has been pre-stored in the nonvolatile memory 168, the controller 16 selects the group of control signal codes corresponding to the control signal code, and sets it as a group of control signal codes for use in the remote control signal transmitter 7. On the other hand, if the controller 16 has determined that the received control signal code is not stored in the nonvolatile memory 168, it will control the nonvolatile memory 168 to store information on the device to be controlled, such as manufacturer's name or model of the device, while storing a group of control signal codes corresponding to the information in the form of a table as shown in FIG. 4. For example, a newly stored control signal code will be stored in the auxiliary VTR part along with the information such as the manufacturer's name or model of the device to be controlled, registered by the user.

For example, when the receiver 1 turns on or off the recorder 2, the controller 16 will read a control signal code for the power on/off from the group of control signal codes stored in the ROM 162 and nonvolatile memory 168, control a recorder control signal generation circuit 19 to generate a remote control signal for the recorder 2, and sends the remote control signal to the photodetector 25 of the recorder 2 via the remote control signal transmitter 7.

In this way, the receiver 1 can discriminate the model of the recorder 2 and select a group of control signal codes corresponding to the model by receiving the remote control signal sent from the remote commander 5 for the recorder 2 and making a comparison between the remote control signal and the group of control signal codes pre-stored in the nonvolatile memory 168, and can thus set the group of control signal codes as a group of control signal codes to be used in the remote control signal transmitter 7. Therefore, the user has not to know the manufacturer's name and model of his or her recorder 2, group of control signal codes, etc. since a group of control signal codes to be used in the remote control signal transmitter 7 is automatically set.

As shown, the recorder 2 includes a UHF/VHF tuner 21 that selects a signal having a desired carrier frequency from NTSC-based signals (NTSC=National Television System Committee) received by a UHF (ultra-high frequency)/VHF (very high frequency) antenna 9, a demodulation circuit 22 that demodulates the selected signal into a video signal, an input selection circuit 23 that makes a selection between the video signal received from the receiver 1 and video signal demodulated by the demodulation circuit 22, a recording/reproduction circuit 24 that records and/or reproduces the video signal, and a control circuit 27 that controls the channel (signal) selection, demodulation, input selection and recording/reproduction.

As shown, the recorder 2 also includes a photodetector 25 that detects a remote control signal S3 sent from the remote commander 5, and a remote control signal S2 sent from the remote control signal transmitter 7, and a remote control signal receiver 26 that decodes the remote control signals received by the photodetector 25. Thus, the recorder 2 is remote-controlled by the remote commander 5.

As shown, the TV set 3 includes a UHF/VHF tuner 31 that selects a signal having a desired carrier frequency from NTSC-based signals received by the UHF/VHF antenna 9, a demodulation circuit 32 that demodulates the selected signal into a video signal, an input selection circuit 33 that makes a selection between the video signal received from the recorder 2 and video signal demodulated by the demodulation circuit 32, a video processing circuit 34 that make signal processing such as separation of the video signal into R, G and B signals, a video display unit 35 that displays a picture produced from the processed video signal, and a control circuit 38 that controls the channel (signal) selection, demodulation, input selection and video processing.

As shown, the TV set 3 also includes a photodetector 36 that detects a remote control signal S4 sent from a light emitter 61 of the remote commander 6, and a remote control signal receiver 37 that decodes the remote control signal received by the photodetector 36. Thus, the TV set 3 can be controlled with the remote control signal.

The reception system 100 constructed as having been illustrated and described above operates for recording as will be described below. The recorder 2 and TV set 3 included in the reception system 100 according to this embodiment include no tuner that receives a BS/CS broadcast, but the receiver 1 receives a BS/CS broadcast.

In the BS/CS broadcast, program information indicating a broadcast channel and broadcast time is sent, and an electronic program guide (EPG) can be displayed on the display screen of a video display unit 35 of the TV set 3 on the basis of the program information. Also, when the user designates a broadcast channel to be recorded and a broadcast time with the use of the EPG, the receiver 1 can control the recorder 2 to record the broadcast. As having previously been described, the received program information is stored in the RAM 163, the CPU 161 generates an EPG on the basis of the program information, the OSD display unit generates a video signal for an EPG-based display, this video signal for the EPG-base display is combined with the broadcast program video signal, and thus the EPG is displayed on the display screen of the TV set 3.

The user can set the recorder 2 for recording by operating control buttons (not shown) at the remote commander 4 of the receiver 1 while watching an EPG screen the receiver 1 has the TV set 3 display in the OSD manner.

When a set time is nearly reached, the receiver 1 receives a desired program by means of the BS/CS tuner 10 and sends a remote control signal including a control signal code which turns on the recorder 2 from the remote control signal transmitter 7 to the recorder 2 which will be put into operation and make a temporary suppression of recording. It should be noted that the input selection circuit 23 of the recorder 2 is to be pre-set for reception of an external input, that is, a signal from the receiver 1. When the set time is reached thereafter, the receiver 1 will send a control signal code for start of the recording to the recorder 2 and have the receiver 2 record a video signal received by the receiver 1. Thus, the receiver 1 can control the recording at the recorder 2 by sending the control signal code to the recorder 2 via the remote control signal transmitter 7. It should be noted that a control signal code for start of recording may be sent following a control signal code for turning on the recorder 2.

Figure 8:
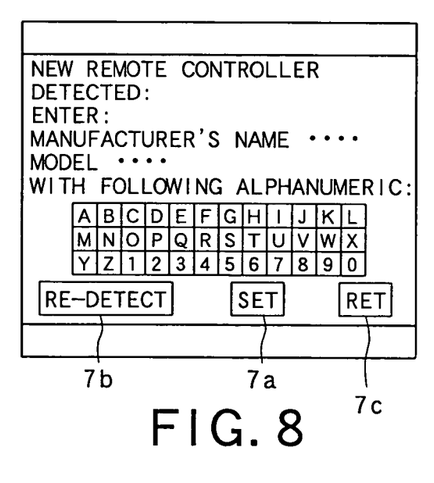
FIG. 8 shows another example screen displayed on the TV set for selection of a remote control signal.
Figure 9:
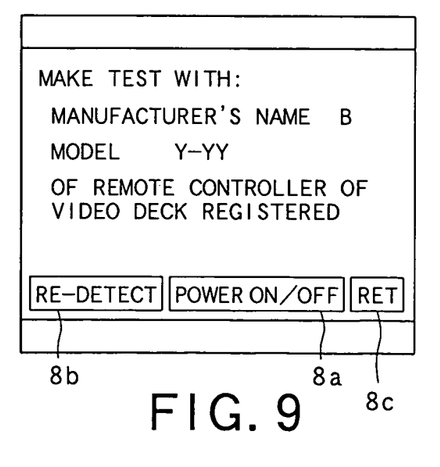
FIG. 9 shows another example screen displayed on the TV set for selection of a remote control signal.
Figure 10:
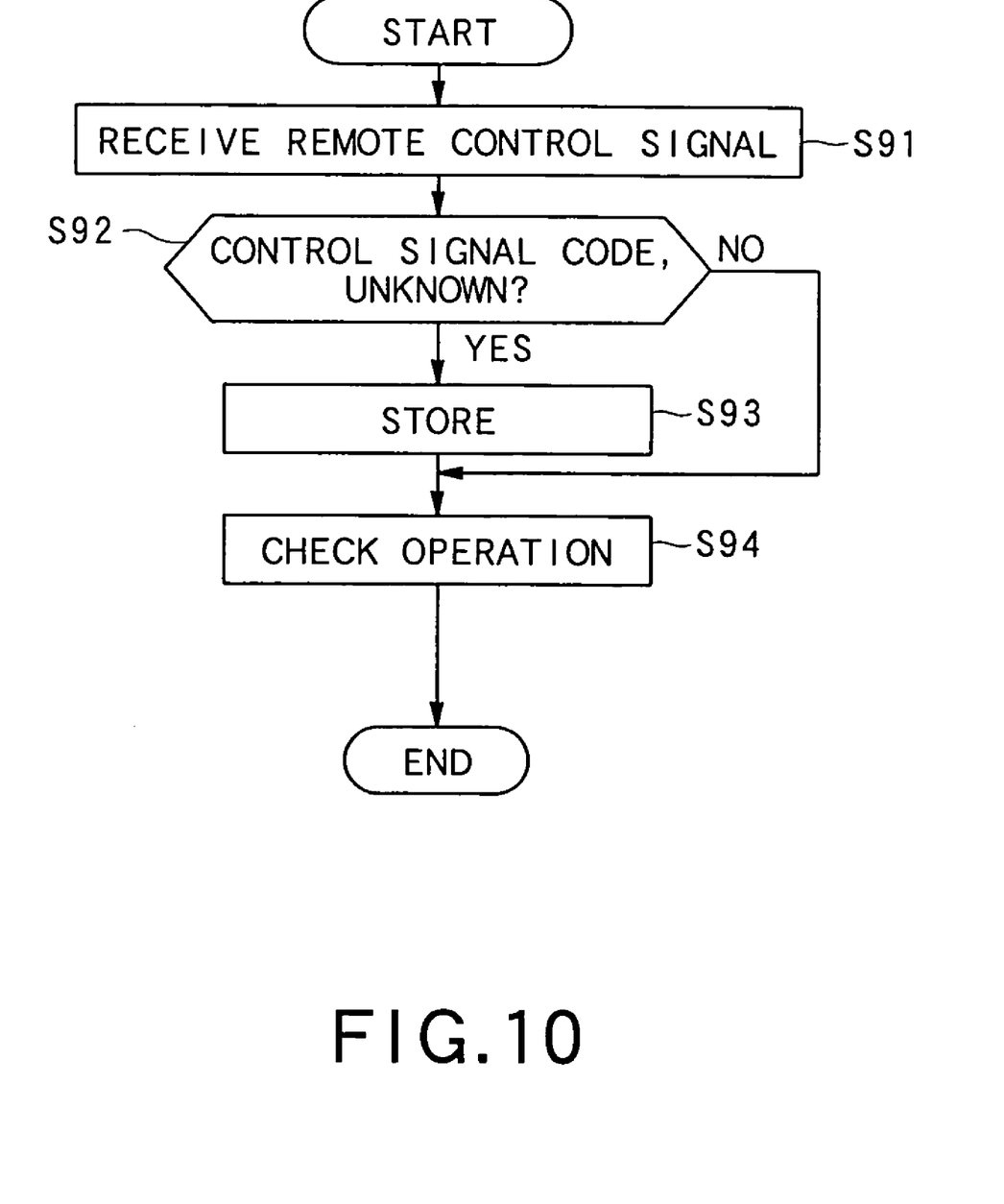
FIG. 10 shows a flow of operations made in selection of a remote control signal.

Next, the remote control signals sent by the remote control signal transmitter 7 are set as will be described below with reference to FIGS. 5 to 10 in which FIGS. 5 to 9 show together an example of screen display made during setting of a remote control signal and FIG. 10 shows, by way of example, a flow of operations of the receiver 1 during setting of the remote control signal. In the setting of a remote control signal, a control signal code for the remote control signal S2 sent from the remote control signal transmitter 7 is processed for compatibility with the recorder 2 in order to control the latter. It should be noted that it is assumed in the following description that the receiver 1 according to this embodiment can operate in a normal and also in a remote control signal setting mode. The remote commander 4 accessory to the receiver 1 makes a selection between the normal and setting modes. In the normal mode, the receiver 1 receives a broadcast program and displays the content of the program. In the setting mode, the receiver 1 sets a remote control signal. The receiver 1 operates in the setting mode as will be described below.

Figure 5:
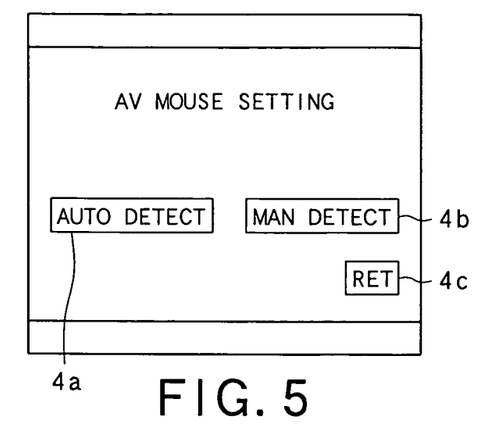
FIG. 5 shows an example screen displayed on a TV set for selection of a remote control signal.
Figure 6:
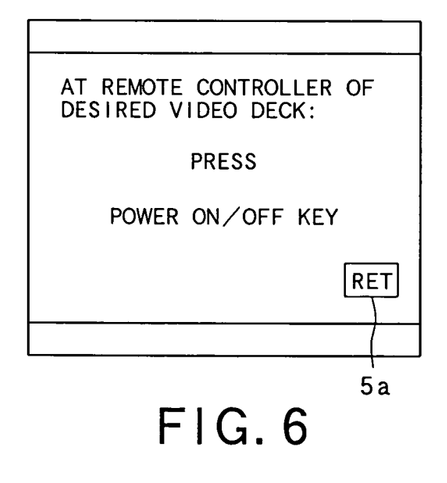
FIG. 6 shows another example screen displayed on the TV set for selection of a remote control signal.

First after the user sets the receiver 1 to the setting mode, the receiver 1 will have the TV set 3 display a screen as shown in FIG. 5 for setting of a remote control signal which is sent from the remote control signal transmitter 7, that is, for setting the AV mouse. When an automatic detection (Auto Detect) button 4a shown in FIG. 5 is selected by the user, a prompt for pressing a POWER ON/OFF key (not shown) at the remote commander 5 of the recorder 2 will appear on the screen as shown in FIG. 6. It should be noted that each of the buttons displayed on the screen is selected by the user operating a corresponding key on the remote commander 4 of the receiver 1. In response to the prompt, the user press the POWER ON/OFF key (not shown) at the remote commander 5 of the recorder 2 to sent the remote control signal S3 for turning on/off the power supply from the light emitter 51 of the remote command 5 to the photodetector 17 of the receiver 1. It should be noted that although in this embodiment, the manufacturer's name or model of the recorder 2 is recognized using a control signal code for turning on/off the power supply, the present invention is not limited to this arrangement but a control signal code for starting a recording may be used for this purpose, for example.

Also, when a manual detection (Man Detect) button 4b shown in FIG. 5 is selected, the remote control signal transmitter 7 will be set in the same manner as the conventional one. More specifically, the user selects a group of control signal codes for remote control signals for use in the recorder 2 while looking at a cross-reference listing recorder manufacturers and control signal code groups as shown in FIG. 1. Also, when a return (Ret) button 4c is selected, the setting of the remote control signal transmitter 7 will be complete. It should be noted that when a return (Ret) button 5a shown in FIG. 6 is selected, the display screen shown in FIG. 5 will appear again.

When the POWER ON/OFF key (not shown) is pressed at the remote command 5 of the recorder 2 with the screen in FIG. 6 being displayed, the receiver 1 will receive a remote control signal S3 for turning on/off the power supply, supplied from the remote command 5, at the photodetector 17 (in step S91 in FIG. 10), and decode the remote control signal S3 in the remote control signal reception circuit 18 to read a control signal code. The control signal code is supplied to the controller 16 via the interface 165, and the controller 16 will make a consecutive comparison between received control signal code and a plurality of custom codes stored in the nonvolatile memory 168 to judge whether a control signal code corresponding to the received control signal code is stored in the nonvolatile memory 168 (in step S92).

Figure 7:
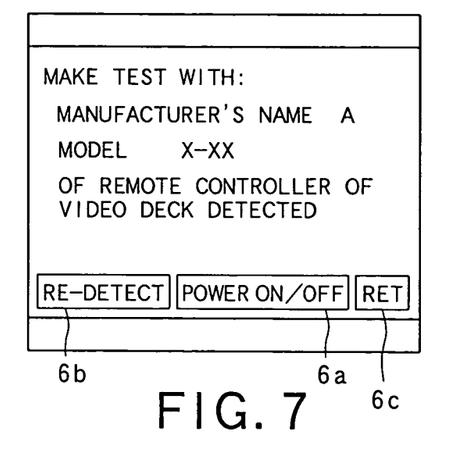
FIG. 7 shows another example screen displayed on the TV set for selection of a remote control signal.

In case the received control signal code is found stored in the nonvolatile memory 168, the controller 16 will have the TV set 3 display information on the recorder 2 which uses the control signal code included in the remote control signals, such as manufacturer's name, model, etc. of the recorder 2, and also a prompt for checking the operation of the recorder 2, caused after a POWER ON/OFF button 6a as shown in FIG. 7 (in step S94). When the user selects the POWER ON/OFF button 6a, the controller 16 will have the remote control signal transmitter 7 output the remote control signal S2 including a control signal code corresponding to a detected control signal code. In case the recorder 2 can be turned on/off with this remote control signal S2, it means that a correct control signal code has been selected. If the manufacturer's name and model are different from those of the recorder 2 or the recorder 2 has not been put into operation, a re-detect (Re-detect) button 6b is selected and the controller 16 will restore the display screen shown in FIG. 5. Also, when a return (Ret) button 6c is selected, the display screen shown in FIG. 6 will appear again.

If the received control signal code is not found in the nonvolatile memory 168, the controller 16 will have the TV set 3 display a screen as shown in FIG. 8, giving a prompt to the user for registration of a control signal code. Then, the user will register a control signal code by operating the remote commander 4 accessory to the receiver 1 in response to the message on the display screen in FIG. 8 for example to enter the manufacturer's name and model of his recorder 2 and selecting a set (Set) button 7a. The receiver 1 will store information such as the registered manufacturer's name, model, etc. and control signal code into the nonvolatile memory 168 (in step S93). It should be noted that an electrically erasable programmable read-only memory (EEPROM) may be used in place of the nonvolatile memory 168. Also, a newly detected control signal code may be stored in the RAM 163 which is always powered from a battery or the like. It should be noted here that the control signal codes to be stored into the RAM 163 include at least those for power on/off operation, input selection, recording start and stop, etc. necessary for recording operation of the recorder 2.

Note that when a re-detect (Re-detect) button 7b shown in FIG. 8 is pressed, the controller 16 will cause re-appearance of the display screen shown in FIG. 5. When a return (Ret) button 7c is selected, the controller 16 will restore the display screen in FIG. 6.

After storing the control signal code information into the nonvolatile memory 168, the controller 16 will display information on the recorder 2, such as the manufacturer's name, model, etc. of the recorder 2, registered in the display screen shown in FIG. 9 similarly to the display screen in FIG. 5, and prompt the user to check the operation of the recorder 2 using a POWER ON/OFF button 8a (in step S94). If no operation of the recorder 2 is recognized, a re-detect (Re-detect) button 8b will be selected and the controller 16 will restore the display screen in FIG. 8. When a return (Ret) button 8c is selected, the controller will cause re-appearance of the display screen in FIG. 6.

If the POWER ON/OFF button 6a or 8a (shown in FIGS. 7 and 9) is selected in the operation check in step S94, the controller 16 will have the recorder control signal generation circuit 19 generate a remote control signal for a power on/off control signal code used in the operation-recognized recorder 2 and send it to the photodetector 25 of the recorder 2 via the remote control signal transmitter 7. Then, the user checks the power on/off operation of the recorder 2.

As having been described above, it is possible to easily determine a remote control signal for control of the recorder 2 by pre-storing the control signal codes for remote control signals and information such as manufacturer's name or model in correlation with each other in the nonvolatile memory 168, making a consecutive comparison between a received control signal code and a plurality of control signal codes pre-stored in the nonvolatile memory 168, selecting a control signal, if any, which corresponding to a control signal stored in the nonvolatile memory 168, and displaying, on the TV set 3, the model of the recorder 2 in which the selected control signal code is adopted, for checking by the user.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims. For example, although the embodiment of the present invention has been illustrated and described concerning the BS/CS digital broadcast set-top box (STB), the present invention is not limited to such a STB but may be applied to a CATV broadcast STB.

Also, the group of control signal codes stored by manufacturer's name or model in the nonvolatile memory 168 is available via the Internet or the like, for example.

Also, although a signal resulted from decoding of MPEG data is stored in the recorder 2 in the aforementioned embodiment of the present invention, the system may be adapted for recording such MPEG data as it is.

In the broadcast receiving system having been described an embodiment of the present invention, the model of a recorder 2 can be identified on the basis of a control signal code for a power on/off-oriented remote control signal, for example, supplied from the remote commander 5 called "remote controller" accessory to the recorder 2. Therefore, it is possible to save the labor and time taken for the user to search a plurality of control signal codes used by the same manufacturer for a control signal code corresponding to the recorder 2. Also, even if no control signal code corresponding to the recorder 2 is stored in the nonvolatile memory 168, the recorder 2 of any model can be remote-controlled with a group of control signal codes corresponding to the recorder 2 being stored in the nonvolatile memory 168.

What is claimed is:

1. A broadcast receiving apparatus which receives a broadcast signal and supplies a recorder, remote-controllable with a remote control signal from a remote commander, with audio information and video information in the broadcast signal which are to be recorded to the recorder, the apparatus comprising:

a memory in which control signal codes possibly usable as signals for remote control of the recorder and which include information such as the manufacturer's name or model of the recorder are collected by manufacturer or model of the recorder into a group of control signal codes and the group of control signal codes is stored in correlation with the recorder manufacturer or model;

a receiver which receives a remote control signal output from the remote commander and detects a control signal code included in the remote control signal;

a selector which makes a comparison between the recorder manufacturer or model information included in the control signal code detected by the receiver and the recorder manufacturer or model information pre-stored in the memory and selects, in case the recorder manufacturer or model information included in the detected control signal code is stored in the memory, a group of control signal codes corresponding to the recorder manufacturer or model information included in the control signal code detected by the receiver as a group of control signal codes corresponding to the recorder;

an operation controller which generates, from the group of control signal codes selected by the selector, a control signal code for remote control of the operation of the recorder; and a transmitter which sends a remote control signal to the recorder on the basis of the control signal code generated by the operation controller, wherein the remote control signal code is automatically generated without being selected by a user.

2. The apparatus according to claim 1, wherein in case the memory has not stored therein the recorder manufacturer or model information included in the detected control signal code, the selector stores, into the memory, a control signal code included in a remote control signal output from the remote commander.

3. A broadcast receiving system including a recorder remote-controllable with a remote control signal from a remote commander and a broadcast receiving apparatus which receives a broadcast signal and supplies the recorder with audio information and video information in the broadcast signal which are to be recorded to the recorder, the broadcast receiving apparatus comprising:

a memory in which control signal codes possibly usable as signals for remote control of the recorder and which include information such as the manufacturer's name or model of the recorder are collected by manufacturer or model of the recorder into a group of control signal codes and the group of control signal codes is stored in correlation with the recorder manufacturer or model;

a receiver which receives a remote control signal output from the remote commander and detects a control signal code included in the remote control signal;

a selector which makes a comparison between the recorder manufacturer or model information included in the control signal code detected by the receiver and the recorder manufacturer or model information pre-stored in the memory and selects, in case the recorder manufacturer or model information included in the detected control signal code is stored in the memory, a group of control signal codes corresponding to the recorder manufacturer or model information included in the control signal code detected by the receiver as a group of control signal codes corresponding to the recorder;

an operation controller which generates, from the group of control signal codes selected by the selector, a control signal code for remote control of the operation of the recorder; and a transmitter which sends a remote control signal to the recorder on the basis of the control signal code generated by the operation controller, wherein the remote control signal code is automatically generated without being selected by a user.

4. The system according to claim 3, wherein in case the memory has not stored therein the recorder manufacturer or model information included in the detected control signal code, the selector stores, into the memory, a control signal code included in a remote control signal output from the remote commander.

5. The system according to claim 3, wherein the broadcast receiving apparatus has an on-screen display which makes an on-screen display of the manufacturer or model of the recorder which uses the selected group of control signal codes.

6. A method of selecting a control signal in a broadcast receiving system including a recorder remote-controllable with a remote control signal from a remote commander and a broadcast receiving apparatus which receives a broadcast signal and supplies the recorder with audio information and video information in the broadcast signal which are to be recorded to the recorder and in which the recorder is remote-controlled by the broadcast receiving apparatus, the method comprising:

a reception step of receiving a remote control signal output from the remote and detecting a control signal code including information such as the manufacturer's name or model of the recorder, included in the remote control signal;

a selection step of making a comparison between the recorder manufacturer or model information included in the control signal code detected in the reception step and the recorder manufacturer or model information pre-stored in a memory in correlation with a group of control signal codes into which control signal codes possibly usable as signals for remote control of the recorder being collected by manufacturer or model of the recorder and selecting, in case the recorder manufacturer or model information included in the detected control signal code is stored in the memory, a group of control signal codes corresponding to the recorder manufacturer or model information included in the control signal code detected in the reception step as a group of control signal codes corresponding to the recorder;

an operation control step of generating, from the group of control signal codes selected in the selection step, a control signal code for remote control of the operation of the recorder; and a transmission step of sending a remote control signal to the recorder on the basis of the control signal code generated in the operation control step, wherein the remote control signal code is automatically generated without being selected by a user.

7. The method according to claim 6, wherein in the selection step, if the memory has not stored therein the recorder manufacturer or model information included in the detected control signal code, there is stored, into the memory, a control signal code included in a remote control signal output from the remote commander and the stored group of control signal codes is selected as a group of control signal codes corresponding to the recorder.

8. The method according to claim 6, further including an on-screen display step in which there is made an on-screen display of the manufacturer or model of the recorder which uses the selected group of control signal codes.

* * * * *